United States Patent
Aoki

(10) Patent No.: US 7,698,886 B2
(45) Date of Patent: Apr. 20, 2010

(54) CATALYST DETERIORATION DEGREE ACQUIRING APPARATUS IN INTERNAL COMBUSTION ENGINE

(75) Inventor: Keiichiro Aoki, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 121 days.

(21) Appl. No.: 12/133,473

(22) Filed: Jun. 5, 2008

(65) Prior Publication Data

US 2009/0019834 A1    Jan. 22, 2009

(30) Foreign Application Priority Data

Jul. 20, 2007    (JP) .............................. 2007-188990

(51) Int. Cl.
*F01N 3/00*    (2006.01)
(52) U.S. Cl. .............................. 60/277; 60/274; 60/276; 60/285; 701/103; 701/109
(58) Field of Classification Search .................. 60/274, 60/276, 277, 285; 701/103, 109
See application file for complete search history.

(56) References Cited

U.S. PATENT DOCUMENTS

| | | | |
|---|---|---|---|
| 5,842,340 A * | 12/1998 | Bush et al. .................... 60/274 |
| 6,637,194 B2 * | 10/2003 | Kakuyama et al. ............ 60/285 |
| 6,751,950 B2 * | 6/2004 | Ikemoto et al. ................ 60/285 |
| 6,772,585 B2 * | 8/2004 | Iihoshi et al. .................. 60/277 |
| 6,901,744 B2 * | 6/2005 | Kako et al. .................... 60/285 |
| 7,412,820 B2 * | 8/2008 | Iida et al. ....................... 60/274 |

FOREIGN PATENT DOCUMENTS

| | | |
|---|---|---|
| JP | 2003-97334 | 4/2003 |
| JP | 2003-166414 | 6/2003 |

* cited by examiner

*Primary Examiner*—Binh Q. Tran
(74) *Attorney, Agent, or Firm*—Oblon, Spivak, McClelland, Maier & Neustadt, L.L.P.

(57) ABSTRACT

The apparatus obtains a decreasing gradient of the maximum oxygen storing quantity Cmax with respect to the increase in an air flow rate Ga on the basis of two maximum oxygen storing quantities Cmax, which are respectively estimated in case where the air flow rate Ga assumes two different values, and the two values of the air flow rate Ga. As the deterioration degree of the catalyst unit 53 increases, the decreasing gradient increases. When the deterioration degree of the catalyst unit 53 is the same, the decreasing gradient tends to be the same, even if the degree of the response of the change in the output from a downstream air-fuel-ratio sensor 67 varies. Accordingly, the obtained decreasing gradient can be a value correctly indicating the deterioration degree of the catalyst unit 53.

2 Claims, 5 Drawing Sheets

US 7,698,886 B2

CATALYST DETERIORATION DEGREE ACQUIRING APPARATUS IN INTERNAL COMBUSTION ENGINE

BACKGROUND OF THE INVENTION

1. Field of the Invention

The present invention relates to a catalyst deterioration degree acquiring apparatus that is disposed in an exhaust passage of an internal combustion engine and has an oxygen storing function.

2. Description of the Related Art

In general, a catalyst (three-way catalyst) disposed in an exhaust passage of an internal combustion engine and has an oxygen storing function is deteriorated as a result of poisoning by lead, sulfur, or the like contained in a fuel, or heat applied to the catalyst, whereby the maximum oxygen storing quantity, which is the maximum value of the oxygen storable in the catalyst, decreases, as the deterioration of the catalyst progresses. In other words, the maximum oxygen storing quantity can be an index indicating the degree of the deterioration of the catalyst. Therefore, if the maximum oxygen storing function of the catalyst can be estimated (detected), the degree of the deterioration of the catalyst can be acquired on the basis of the estimated maximum oxygen storing function.

On the basis of this knowledge, the apparatus disclosed in Japanese Patent Application Laid-Open No. 2003-97334 estimates the maximum oxygen storing quantity in the manner described below. Specifically, the air-fuel ratio of the gas flowing into the catalyst is controlled to be a predetermined rich air-fuel ratio that is on the richer side with respect to a stoichiometric air-fuel ratio so as to set the oxygen storing amount of the catalyst to be "0". Thereafter, the air-fuel ratio of the gas is controlled to be a predetermined lean air-fuel ratio that is on the leaner side with respect to the stoichiometric air-fuel ratio. The amount of oxygen flowing into the catalyst per a unit time is totaled over a period from the time when the oxygen storing quantity of the catalyst reaches the maximum oxygen storing quantity to the time when the output from an air-fuel-ratio sensor at the downstream side of the catalyst changes to a value showing the lean state, whereby the maximum oxygen storing quantity is estimated. Alternatively, the air-fuel ratio of the gas flowing into the catalyst is controlled to be the aforesaid predetermined lean air-fuel ratio so as to set the oxygen storing quantity to the maximum oxygen storing quantity, and then, the air-fuel ratio of the gas is controlled to be the aforesaid rich air-fuel ratio. The amount of oxygen emitted (consumed) per a unit time in the catalyst is totaled over a period from the time when the oxygen storing quantity of the catalyst becomes "0" to the time when the output from the air-fuel-ratio sensor at the downstream side of the catalyst is changed to the value showing the rich state, whereby the maximum oxygen storing quantity is estimated. The degree of deterioration of the catalyst is acquired on the basis of the maximum oxygen storing quantity thus estimated. The state in which "the output from the air-fuel-ratio sensor indicates the lean state (or rich state)" means the state indicating that the output from the air-fuel-ratio sensor is the air-fuel ratio on the leaner (or richer) side with respect to the stoichiometric air-fuel ratio. The control for forcibly changing the air-fuel ratio of the gas flowing into the catalyst to either one of the predetermined rich air-fuel ratio and the predetermined lean air-fuel ratio from the other as described is referred to as "air-fuel-ratio active control" below.

Meanwhile, the degree of the response to the change (changeover) of the output from the air-fuel-ratio sensor with respect to the change in the air-fuel ratio of the exhaust gas from either one of the air-fuel ratio on the rich side with respect to the stoichiometric air-fuel ratio and the air-fuel ratio on the lean side with respect to the stoichiometric air-fuel ratio to the other has a characteristic of being likely to vary depending upon the property of the air-fuel-ratio sensor itself, deterioration, or the like. Therefore, the point when the output from the air-fuel-ratio sensor at the downstream side of the catalyst is changed to the value showing the lean state or to the value showing the rich state is likely to be deviated from the time when the oxygen storing quantity of the catalyst reaches the maximum oxygen storing quantity or becomes "0". Accordingly, an error is produced in the estimation of the maximum oxygen storing quantity, which entails a problem that it is difficult to correctly acquire the degree of deterioration of the catalyst.

SUMMARY OF THE INVENTION

An object of the present invention is to provide a catalyst deterioration degree acquiring apparatus that acquires the degree of deterioration of the catalyst on the basis of at least the point when the output from an air-fuel-ratio sensor disposed in an exhaust passage at the downstream side of a catalyst is changed to a value showing a lean state or to a value showing a rich state, wherein the degree of deterioration of the catalyst can correctly be acquired, even if the degree of the response of the change in the output from the air-fuel-ratio sensor is likely to be varied.

A catalyst deterioration degree acquiring apparatus according to the present invention is applicable to an internal combustion engine including a catalyst that is disposed in an exhaust passage of the internal combustion engine and has an oxygen storing function, and an air-fuel-ratio sensor that is disposed in the exhaust passage at the downstream side of the catalyst for outputting a value according to an air-fuel ratio of a gas flown out of the catalyst.

Here, the air-fuel-ratio sensor disposed at the downstream side of the catalyst in the exhaust passage may be an electro-motive-force-type (concentration cell type) oxygen concentration sensor or a limiting-current-type oxygen concentration sensor.

The feature of the catalyst deterioration degree acquiring apparatus according to the present invention is that the apparatus has maximum oxygen storing quantity estimating means that changes the air-fuel ratio of the gas flowing into the catalyst to a predetermined lean air-fuel ratio, which is on the lean side with respect to the stoichiometric air-fuel ratio, from an air-fuel ratio on the rich side with respect to the stoichiometric air-fuel ratio at the point when the output from the air-fuel-ratio sensor is changed to the state indicating the air-fuel ratio on the rich side with respect to the stoichiometric air-fuel ratio from the state indicating the air-fuel ratio on the lean side with respect to the stoichiometric air-fuel ratio; changes the air-fuel ratio of the gas flowing into the catalyst to a predetermined rich air-fuel ratio, which is on the rich side with respect to the stoichiometric air-fuel ratio, from an air-fuel ratio on the lean side with respect to the stoichiometric air-fuel ratio at the point when the output from the air-fuel-ratio sensor is changed to the state indicating the air-fuel ratio on the lean side with respect to the stoichiometric air-fuel ratio from the state indicating the air-fuel ratio on the rich side with respect to the stoichiometric air-fuel ratio; and estimates the maximum oxygen storing quantity, which is the maximum quantity of the oxygen storable by the catalyst, by utilizing the point when the output from the air-fuel-ratio sensor is changed after the changeover of the air-fuel ratio of the gas flowing into the catalyst, and at least the predetermined lean air-fuel ratio or the predetermined rich air-fuel ratio; and catalyst deterioration degree acquiring means that acquires, as the deterioration degree of the catalyst, the degree of the decrease of the maximum oxygen storing quantity estimated with respect to the increase in the air flow rate on the basis of plural maximum oxygen storing quantities, which are respectively estimated in case where the flow rate of air sucked into the internal combustion engine assumes plural different values, and the plural values of the air flow rate.

Here, "the flow rate of air sucked into the internal combustion engine" is the mass flow rate (g/s) of air (fresh air) sucked into the internal combustion engine, the volume flow rate (cc/s) of air (fresh air) sucked into the internal combustion engine, or the like, but not limited thereto.

In general, when the flow rate of the gas flowing into the catalyst is great due to the great flow rate of the air sucked into the internal combustion engine and the degree of deterioration of the catalyst is great, in case where the air-fuel ratio of the gas flowing into the catalyst is controlled to be the predetermined rich air-fuel ratio in the above-mentioned "air-fuel-ratio active control", a light unburned component such as methane ($CH_4$) starts to flow out from the catalyst at the point before the time when the reducing oxygen storing quantity of the catalyst becomes "0" (i.e., at the point when the reducing oxygen storing quantity of the catalyst becomes a predetermined oxygen storing quantity greater than "0"), so that the output from the air-fuel-ratio sensor tends to be changed to the value showing the rich state.

Accordingly, the maximum oxygen storing quantity of the catalyst estimated by the maximum oxygen storing quantity estimating means assumes a value smaller than the true maximum oxygen storing quantity of the catalyst by the amount according to the time difference between the period when the output from the air-fuel-ratio sensor in this case is kept to be the value showing the lean state and the period when the output from the air-fuel-ratio sensor is kept to be the value showing the lean state in case where it is supposed that the light unburned component such as methane ($CH_4$) does not start to flow out at the point before the point when the aforesaid oxygen storing quantity of the catalyst becomes "0" (i.e., the time difference between the point when the oxygen storing quantity of the catalyst becomes "0" and the point when the output from the air-fuel-ratio sensor is changed to the value showing the rich state, which point arrives earlier than the aforesaid point) (see FIG. 4).

When the air-fuel ratio of the gas flowing into the catalyst is controlled to be the predetermined lean air-fuel ratio after the output from the air-fuel-ratio sensor is changed to the value showing the rich state, the oxygen storing quantity of the catalyst increases from the above-mentioned "predetermined oxygen storing quantity greater than "0"". Therefore, the time difference between the period when the output from the air-fuel-ratio sensor in this case is kept to be the value showing the rich state and the period when the output from the air-fuel-ratio sensor is kept to be the value showing the rich state in case where it is supposed that the light unburned component such as methane ($CH_4$) does not start to flow out at the point before the point when the aforesaid oxygen storing quantity of the catalyst becomes "0" becomes the same as the time difference described above. Accordingly, in this case too, the maximum oxygen storing quantity of the catalyst estimated by the maximum oxygen storing quantity estimating means assumes a value smaller than the true maximum oxygen storing quantity of the catalyst by the amount according to the above-mentioned time difference (see FIG. 4).

Here, there is a tendency in which, as the flow rate of the air sucked into the internal combustion engine increases, and as the degree of deterioration of the catalyst increases, the above-mentioned time difference increases, so that the estimated maximum oxygen storing quantity becomes much smaller. Specifically, there is a tendency in which, as the degree of deterioration of the catalyst increase, the degree of the increase in the time difference with respect to the increase in the flow rate of the air increases, whereby the degree of the decrease in the estimated maximum oxygen storing quantity with respect to the increase in the flow rate of the air increases (see FIG. 5).

When the degrees of the deterioration of the catalysts are equal to one another, the degrees of the decrease in the estimated maximum oxygen storing quantity with respect to the increase in the flow rate of the air are substantially equal, even if the degree of the response of the change in the output from the air-fuel-ratio sensor varies (see one-dot-chain line and two-dot-chain line in FIG. 5). From the above, the degree of the decrease in the estimated maximum oxygen storing quantity with respect to the increase in the flow rate of the air can be the value correctly indicating the degree of deterioration of the catalyst, regardless of whether there is a variation in the degree of the response of the change in the output from the air-fuel-ratio sensor. In other words, if the degree of the decrease in the estimated oxygen storing quantity with respect to the increase in the flow rate of the air is acquired, the degree of deterioration of the catalyst can correctly be obtained.

The above-mentioned configuration is based upon the knowledge described above. With this configuration, the degree of the decrease in the estimated maximum oxygen storing quantity with respect to the increase in the flow rate of the air is acquired as the degree of deterioration of the catalyst. Accordingly, the degree of deterioration of the catalyst can correctly be acquired, even if the error is produced in the estimation of the maximum oxygen storing quantity, which error is caused by the variation in the degree of the response of the change in the output from the air-fuel-ratio sensor.

In the catalyst deterioration degree acquiring apparatus according to the present invention, the catalyst deterioration degree acquiring means is preferably configured to acquire, as the degree of deterioration of the catalyst, the decreasing gradient of the estimated maximum oxygen storing quantity to the increase in the air flow rate on the basis of two maximum oxygen storing quantities, which are respectively estimated in the case where the flow rate of the air sucked into the internal combustion engine assumes two different values, and two values of the air flow rate.

With this configuration, the number of the combination of the maximum oxygen storing quantity and the air flow rate, which are needed to acquire the degree (in this case, the decreasing gradient) of the decrease in the estimated maximum oxygen storing quantity to the increase in the air flow rate can be made minimum. Therefore, the deterioration degree of the catalyst can simply and quickly be acquired correctly. In this case, as the degree (e.g., the difference between two values, the ratio of two values, etc.) of the difference between two different values of the air flow rate increases, the decreasing gradient of the estimated maximum oxygen storing quantity to the increase in the air flow rate can be the value more correctly indicating the deterioration of the catalyst. Accordingly, as the degree of the difference between two values increases, the deterioration of the catalyst can more correctly be acquired.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

An embodiment of an apparatus for acquiring a degree of deterioration of a catalyst according to the present invention will be described with reference to the drawings.

Figure 1:
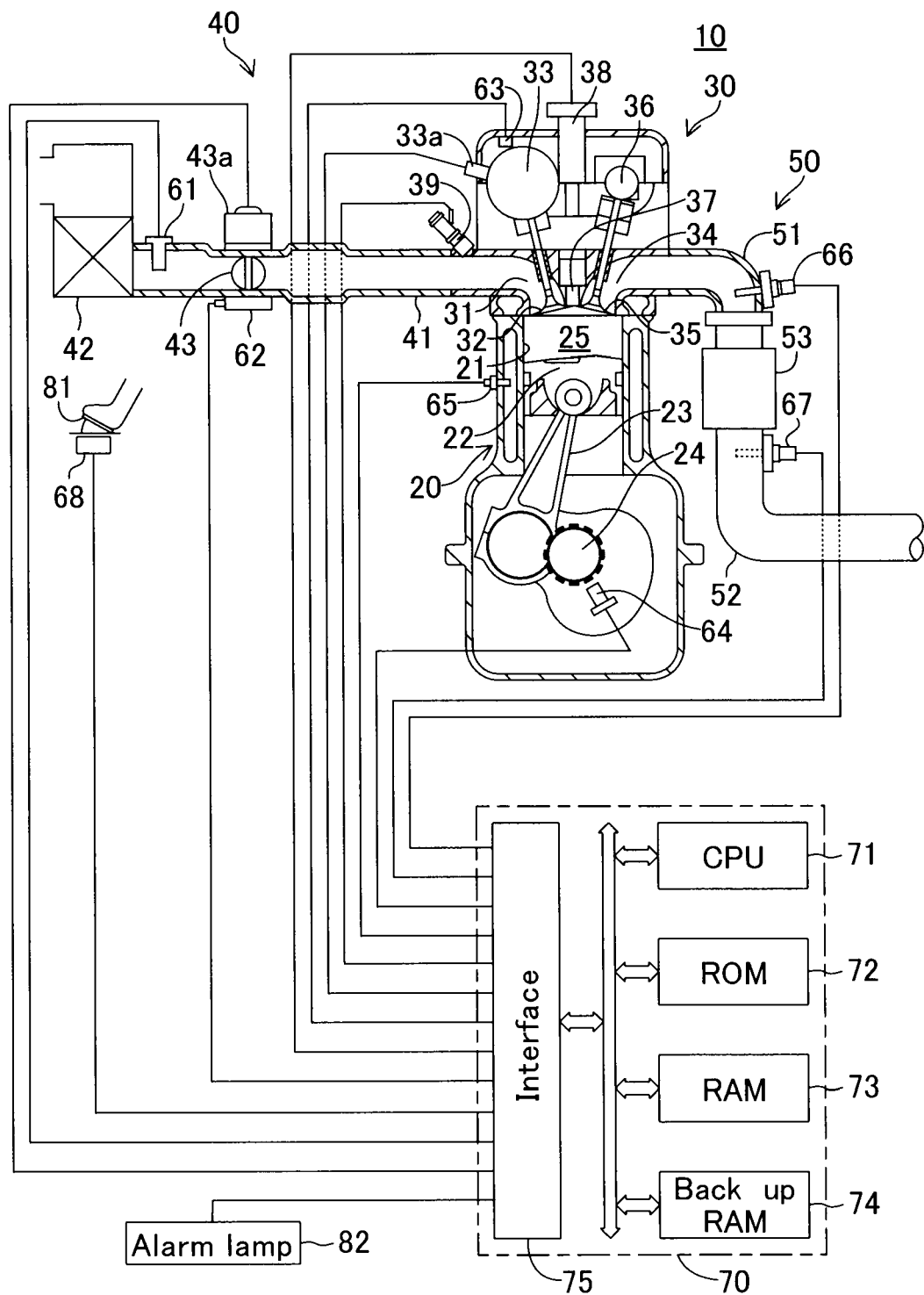
FIG. 1 is a schematic view of a system in which a catalyst deterioration degree acquiring apparatus according to the embodiment of the present invention is applied to an internal combustion engine.

FIG. 1 shows a schematic configuration of a system configured such that a catalyst deterioration degree acquiring apparatus according to the embodiment of the present invention is applied to a spark-ignition multi-cylinder (e.g., 4-cylinder) internal combustion engine 10. The internal combustion engine 10 includes a cylinder block section 20 including a cylinder block, a cylinder block lower-case, an oil pan, etc.; a cylinder head section 30 fixed on the cylinder block section 20; an intake system 40 for supplying gasoline-air mixture to the cylinder block section 20; and an exhaust system 50 for discharging exhaust gas from the cylinder block section 20 to the exterior of the engine.

The cylinder block section 20 includes cylinders 21, pistons 22, connecting rods 23, and a crankshaft 24. Each of the pistons 22 reciprocates within the corresponding cylinder 21. The reciprocating motion of the piston 22 is transmitted to the crankshaft 24 via the corresponding connecting rod 23, whereby the crankshaft 24 rotates. The cylinder 21 and the head of the piston 22, together with the cylinder head section 30, form a combustion chamber 25.

The cylinder head section 30 includes, for each cylinder or all the cylinders, an intake port 31 communicating with the combustion chamber 25; an intake valve 32 for opening and closing the intake port 31; a variable intake timing unit 33 including an intake cam shaft for driving the intake valve 32 and adapted to continuously change the phase angle of the intake cam shaft; an actuator 33a of the variable intake timing unit 33; an exhaust port 34 communicating with the combustion chamber 25; an exhaust valve 35 for opening and closing the exhaust port 34; an exhaust cam shaft 36 for driving the exhaust valve 35; a spark plug 37; an igniter 38 including an ignition coil for generating a high voltage to be applied to the spark plug 37; and an injector (fuel injection means) 39 for injecting fuel into the intake port 31.

The intake system 40 includes an intake pipe 41 including an intake manifold, communicating with the intake port 31, and forming an intake passage together with the intake port 31; an air filter 42 provided at an end portion of the intake pipe 41; a throttle valve 43 provided within the intake pipe 41 and adapted to vary the cross-sectional opening area of the intake passage; and a throttle valve actuator 43a, which consists of a DC motor and serves as throttle valve drive means.

The exhaust system 50 includes an exhaust manifold 51 communicating with the corresponding exhaust port 34; an exhaust pipe 52 connected to the exhaust manifold 51; and a catalyst unit 53 disposed in the exhaust pipe 52. The exhaust port 34, the exhaust manifold 51, and the exhaust pipe 52 form an exhaust passage.

The catalyst unit 53 is a so-called three-way catalyst unit carrying an active component made of a noble metal such as platinum Pt, or the like. When the gas flowing into the catalyst has substantially the stoichiometric air-fuel ratio, the catalyst unit 53 has a function of oxidizing the unburned gas such as CO, HC, etc. and reducing Nox. Further, the catalyst unit 53 has an oxygen storing function for occluding (storing) oxygen. The catalyst unit 53 can purify the unburned gas and Nox thanks to the oxygen storing function, even if the air-fuel ratio is deviated from the stoichiometric air-fuel ratio. The oxygen storing function is also given by ceria $CeO_2$ that is a carrier of the catalyst.

Meanwhile, this system includes a hot-wire air flowmeter 61; a throttle position sensor 62; a cam position sensor 63; a crank position sensor 64; a water temperature sensor 65; an upstream air-fuel-ratio sensor 66; a downstream air-fuel-ratio sensor 67; and an accelerator opening sensor 68.

The hot-wire air flowmeter 61 detects the mass flow rate per unit time of intake air flowing through the intake pipe 41, and outputs a signal indicative of the flow rate Ga of the intake air in the engine. The throttle position sensor 62 detects the opening of the throttle valve 43 and outputs a signal indicative of the throttle-valve opening TA. The cam position sensor 63 generates a signal that assumes the form of a single pulse (G2 signal) every time the intake cam shaft rotates by 90° (i.e., every time the crankshaft 24 rotates by 180°). The crank position sensor 64 outputs a signal that assumes the form of a narrow pulse every 10° rotation of the crankshaft 24 and assumes the form of a wide pulse every 360° rotation of the crankshaft 24. This signal indicates the operation speed NE. The water temperature sensor 65 detects the temperature of cooling water for the internal combustion engine 10 and outputs a signal indicative of the cooling-water temperature THW.

Figure 2:
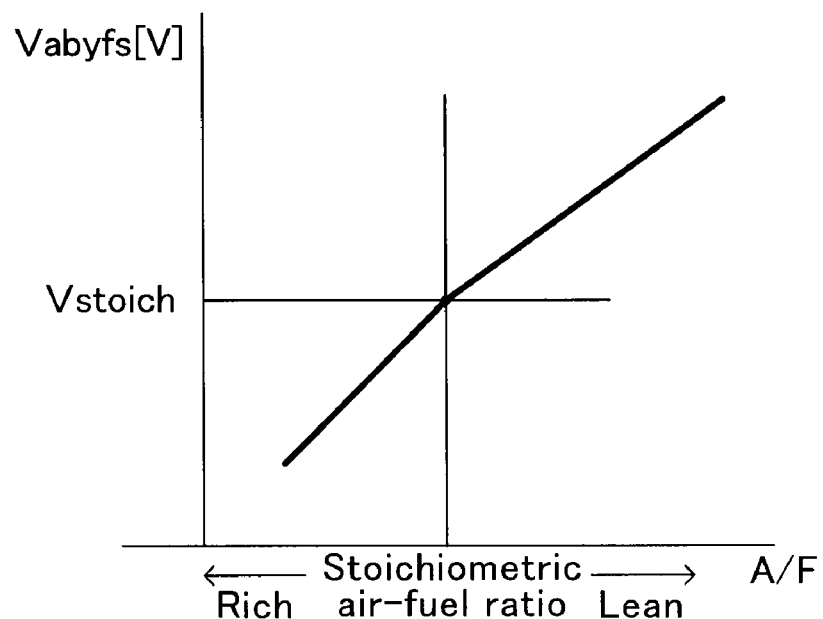
FIG. 2 is a graph showing the relationship between the output voltage from the upstream air-fuel-ratio sensor shown in FIG. 1 and an air-fuel ratio.

The upstream air-fuel-ratio sensor 66 is disposed at the upstream side of the catalyst unit 53 in the exhaust passage. The upstream air-fuel-ratio sensor 66 is a limiting-current-type oxygen concentration sensor. The upstream air-fuel-ratio sensor 66 detects the air-fuel ratio of the exhaust gas flowing into the catalyst unit 53 (hereinafter referred to as "catalyst upstream air-fuel ratio" below), outputs a current corresponding to the measured air-fuel ratio A/F, and outputs a voltage value vabyfs (V), which is a voltage corresponding to the current, as shown by a solid line in FIG. 2. When the air-fuel ratio is equal to the stoichiometric air-fuel ratio, the output value vabyfs (V) becomes a value Vstoich (V) in a normal state. As is apparent from FIG. 2, the upstream air-fuel-ratio sensor 66 can accurately detect the air-fuel ratio A/F over a wide range.

Figure 3:
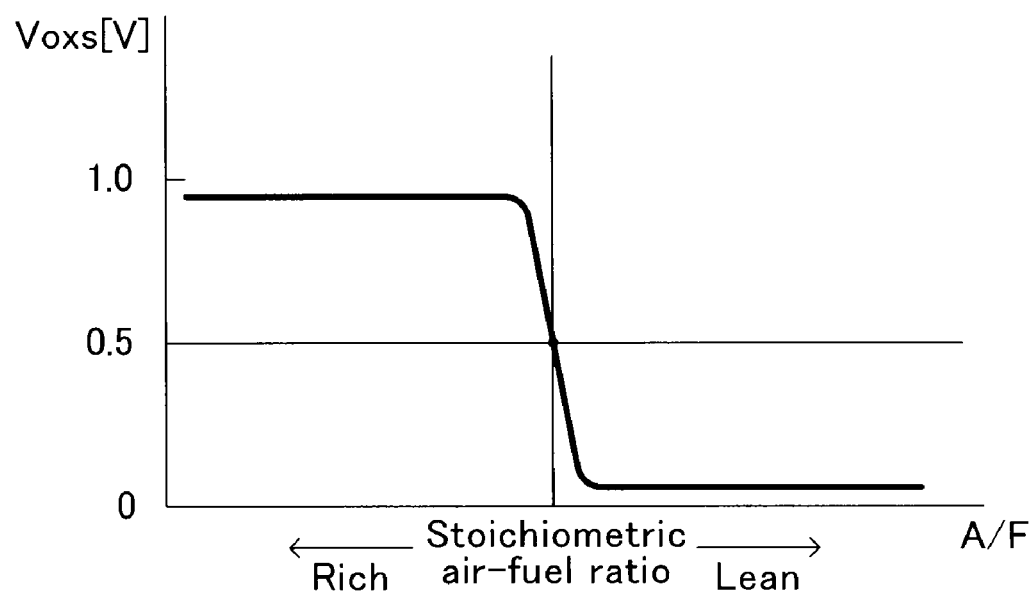
FIG. 3 is a graph showing the relationship between the output voltage from the downstream air-fuel-ratio sensor shown in FIG. 1 and an air-fuel ratio.

The downstream air-fuel-ratio sensor 67 is disposed at the downstream side of the catalyst unit 53 in the exhaust passage. The downstream air-fuel-ratio sensor 67 is an electromotive-force-type (concentration-cell-type) oxygen concentration sensor. As shown in FIG. 3, the downstream air-fuel-ratio sensor 67 outputs about 0.9 V (maximum value) when the air-fuel ratio of the gas flowing out of the catalyst unit 53 is on the rich side with respect to the stoichiometric air-fuel ratio, about 0.1 V (minimum value) when the air-fuel ratio of the gas flowing out of the catalyst unit 53 is on the lean side with respect to the stoichiometric air-fuel ratio, and 0.5 V when the air-fuel ratio of the gas flowing out of the catalyst unit 53 is equal to the stoichiometric air-fuel ratio.

The accelerator opening sensor 68 detects an operation amount of an accelerator pedal 81 operated by a driver, and outputs a signal representing the operation amount Accp of the accelerator pedal 81.

An electric control device 70 is a microcomputer, and includes the following components, which are mutually connected via a bus: a CPU 71; ROM 72 in which routines (programs) to be executed by the CPU 71, tables (lookup tables, maps), constants, and the like are stored in advance; RAM 73 in which the CPU 71 stores data temporarily as needed; backup RAM 74, which stores data while power is on and retains the stored data even while power is held off; and an interface 75 including AD converters. The interface 75 is connected to the sensors 61 to 68. Signals from the sensors 61 to 68 are supplied to the CPU 71 through the interface 75. Drive signals from the CPU 71 are sent, through the interface 75, to the actuator 33a of the variable intake timing unit 33, the igniter 38, the injector 39, and the throttle valve actuator 43a. Further, the interface 75 sends a signal for giving a lighting instruction to an alarm lamp 82 for promoting a driver to exchange the catalyst unit 53.

(Outline of Acquisition of Deterioration Degree of Catalyst)

Next, the outline of the acquisition of the deterioration degree of the catalyst unit 53 executed by the catalyst deterioration degree acquiring apparatus configured as described above will be explained.

The catalyst deterioration degree acquiring apparatus (hereinafter referred to as the "present apparatus" below) executes an air-fuel-ratio control (hereinafter referred to as an "air-fuel-ratio active control" below) for acquiring the degree of deterioration of the catalyst unit 53, when a later-described predetermined catalyst deterioration degree acquiring condition is established. On the other hand, when the predetermined catalyst deterioration degree acquiring condition is not established, an air-fuel-ratio feedback control is executed, in principle, on the basis of the output values Vabyfs and Voxs from the upstream air-fuel-ratio sensor 66 and the downstream air-fuel-ratio sensor 67, such that the catalyst upstream air-fuel ratio coincides with the stoichiometric air-fuel ratio.

Figure 4:
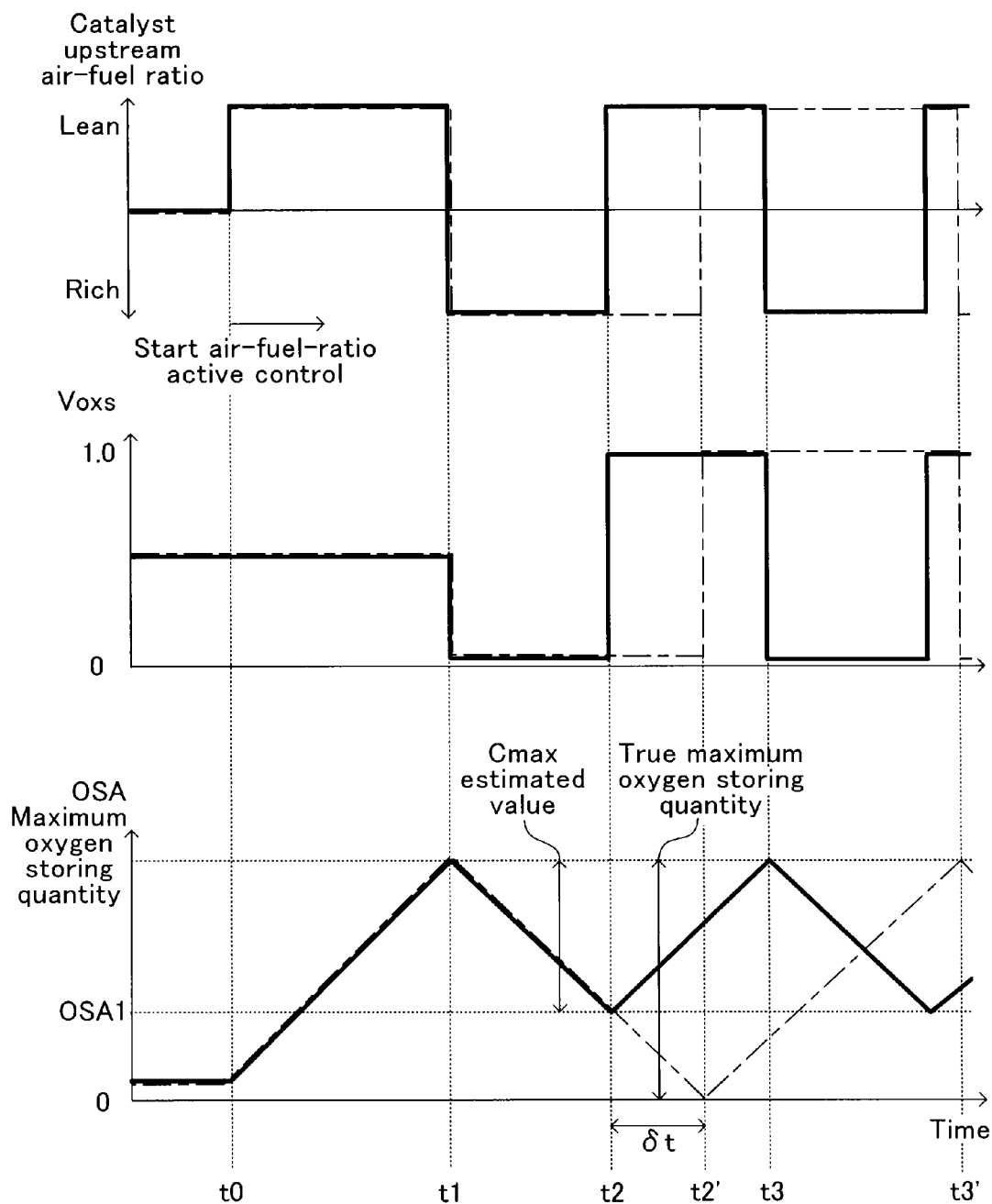
FIG. 4 is a time chart showing one example of a change in the catalyst upstream air-fuel ratio, output value from the downstream air-fuel-ratio sensor, and the oxygen storing quantity of the catalyst, when the catalyst deterioration degree acquiring apparatus shown in FIG. 1 executes an air-fuel ratio active control for estimating the maximum oxygen storing quantity of the catalyst.

FIG. 4 is a time chart showing one example of a change in the catalyst upstream air-fuel ratio, the output value Voxs from the downstream air-fuel-ratio sensor 67, and the oxygen storing quantity OSA of the catalyst unit 53, when the "air-fuel-ratio active control" is started at a time t0. In the "air-fuel-ratio active control" by the present apparatus, the catalyst upstream air-fuel ratio is firstly controlled to be the air-fuel ratio on the lean side (predetermined lean air-fuel ratio), so that the oxygen storing quantity OSA of the catalyst unit 53 increases, and the catalyst upstream air-fuel ratio is controlled to be the air-fuel ratio on the richer side with respect to the stoichiometric air-fuel ratio (predetermined rich air-fuel ratio) at the point (see the time t1) when the oxygen storing quantity OSA reaches the maximum oxygen storing quantity and hence, the output value Voxs from the downstream air-fuel-ratio sensor 67 is reversed (changed) to the value (about 0.1 (V)) showing the lean state.

Thereafter, the oxygen storing quantity OSA of the catalyst unit 53 decreases, and at the point (see the times t2 and t2') when the output value Voxs from the downstream air-fuel-ratio sensor 67 is reversed (changed) to the value (about 0.9 (V)) showing the rich state, the catalyst upstream air-fuel ratio is controlled to be the air-fuel ratio on the lean side with respect to the stoichiometric air-fuel ratio. As described above, the catalyst upstream air-fuel ratio is controlled so as to forcibly be changed from the air-fuel ratio on the rich side with respect to the stoichiometric air-fuel ratio to the air-fuel ratio on the lean side with respect to the stoichiometric air-fuel ratio (or vice versa) at the point when the output from the downstream air-fuel-ratio sensor 67 is changed to the value showing the rich state from the value showing the lean state (or vice versa).

The total quantity of the oxygen discharged (consumed) from the catalyst unit 53 over a period when the output value Voxs from the downstream air-fuel-ratio sensor 67 is kept to be the value indicating the lean state, or the total quantity of the oxygen flowing into the catalyst unit 53 over a period when the output value Voxs from the downstream air-fuel-ratio sensor 67 is kept to be the value indicating the rich state can be regarded to be equal to the maximum oxygen storing quantity of the catalyst unit 53.

The quantity $\delta O_2$ per a unit time of the oxygen discharged (consumed) in the catalyst unit 53 or the oxygen flowing into the catalyst unit 53 is expressed by a product of the deviation $\delta A/F$ of the catalyst upstream air-fuel ratio, obtained from the output value Vabyfs from the upstream air-fuel-ratio sensor 66, from the stoichiometric air-fuel ratio, the fuel injection quantity Fi per a unit time, and a weight ratio (=0.23) contained in the atmosphere (see the following equation (1)). Therefore, the quantity $\delta O_2$ per a unit time of the oxygen is integrated over a period when the output value Voxs from the downstream air-fuel-ratio sensor 67 is kept to be the value indicating the lean state or to the value indicating the rich state, whereby the maximum oxygen storing quantity Cmax of the catalyst unit 53 can be estimated (see the following equation (2)).

$$\delta O_2 = 0.23 \cdot Fi \cdot \delta A/F \quad (1)$$

$$Cmax = \Sigma \delta O_2 \quad (2)$$

The detail explanation of the estimation of the maximum oxygen storing quantity Cmax by the "air-fuel-ratio active control" is disclosed in, for example, Japanese Patent Laid-Open No. 2004-76681, so that the explanation thereof is omitted here. As described above, the present apparatus executes the "air-fuel-ratio active control", and estimates the maximum oxygen storing quantity Cmax by utilizing the equations (1) and (2).

Meanwhile, when the flow rate of the exhaust gas flowing into the catalyst unit 53 is great due to the great air flow rate Ga and the degree of deterioration of the catalyst unit 53 is great, in case where the catalyst upstream air-fuel ratio is controlled to be the air-fuel ratio on the rich side with respect to the stoichiometric air-fuel ratio upon executing the "air-fuel-ratio active control", the light unburned component (having small molecular amount), such as methane ($CH_4$) or the like, starts to flow out of the catalyst unit 53 at the point before the point when the oxygen storing quantity OSA in the reducing catalyst unit 53 becomes "0" (when all oxygen stored in the catalyst unit 53 is discharged (consumed)), whereby the output from the downstream air-fuel-ratio sensor 67 tends to be changed to the value showing the rich state.

Specifically, as shown by the solid line in FIG. 4, when the air flow rate Ga is great, and the degree of deterioration of the catalyst unit 53 is great, the light unburned component starts to flow out of the catalyst unit 53 at the time t2 when the oxygen storing quantity OSA, which is decreasing after the time t1, reaches the quantity OSA1 that is greater than "0", whereby the output value Voxs from the downstream air-fuel-ratio sensor 67, which is kept to be the value showing the lean state, is reversed to be the value showing the rich state.

In this case, the maximum oxygen storing quantity Cmax estimated from the integration of the quantities of oxygen during the period from t1 to t2 is smaller than the true maximum oxygen storing quantity of the catalyst unit 53 by the amount according to the time difference δt between the time t2 and the time t2' when the output value Voxs from the downstream air-fuel-ratio sensor 67 is reversed, on the one-dot-chain line that indicates the change in the case where it is supposed that light unburned component does not start to flow out of the catalyst unit 53 at the point before the point when the oxygen storing quantity OSA reaches "0".

During the period from the time t2 to the time t3 when the output value Voxs from the downstream air-fuel-ratio sensor 67, which is kept to be the value indicating the rich state, is reversed again to the value indicating the lean state, the oxygen storing quantity OSA is increasing from the quantity OSA1 (>0) after the time t2 through the control of the catalyst upstream air-fuel ratio to the air-fuel ratio on the lean side with respect to the stoichiometric air-fuel ratio. Therefore, the period from the time t2 to the time t3 is shorter than the period from the time t2' to the time t3', which corresponds to the period from the time t2 to the time t3, on the on-dot-chain line in FIG. 4 by the time difference δt. Accordingly, the maximum oxygen storing quantity Cmax estimated from the integration of the quantities 602 of oxygen during the period from the time t2 to the time t3 is also smaller than the true maximum oxygen storing quantity of the catalyst unit 53 by the amount according to the time difference δt.

There is a tendency that, as the air flow rate Ga is great and the degree of deterioration of the catalyst unit 53 is great, the timing of the start of the flow-out of the light unburned component from the catalyst unit 53 becomes earlier. Therefore, as the air flow rate Ga is great and the degree of deterioration of the catalyst unit is great, the time difference δt becomes longer, whereby the estimated maximum oxygen storing quantity Cmax also becomes smaller.

Figure 5:
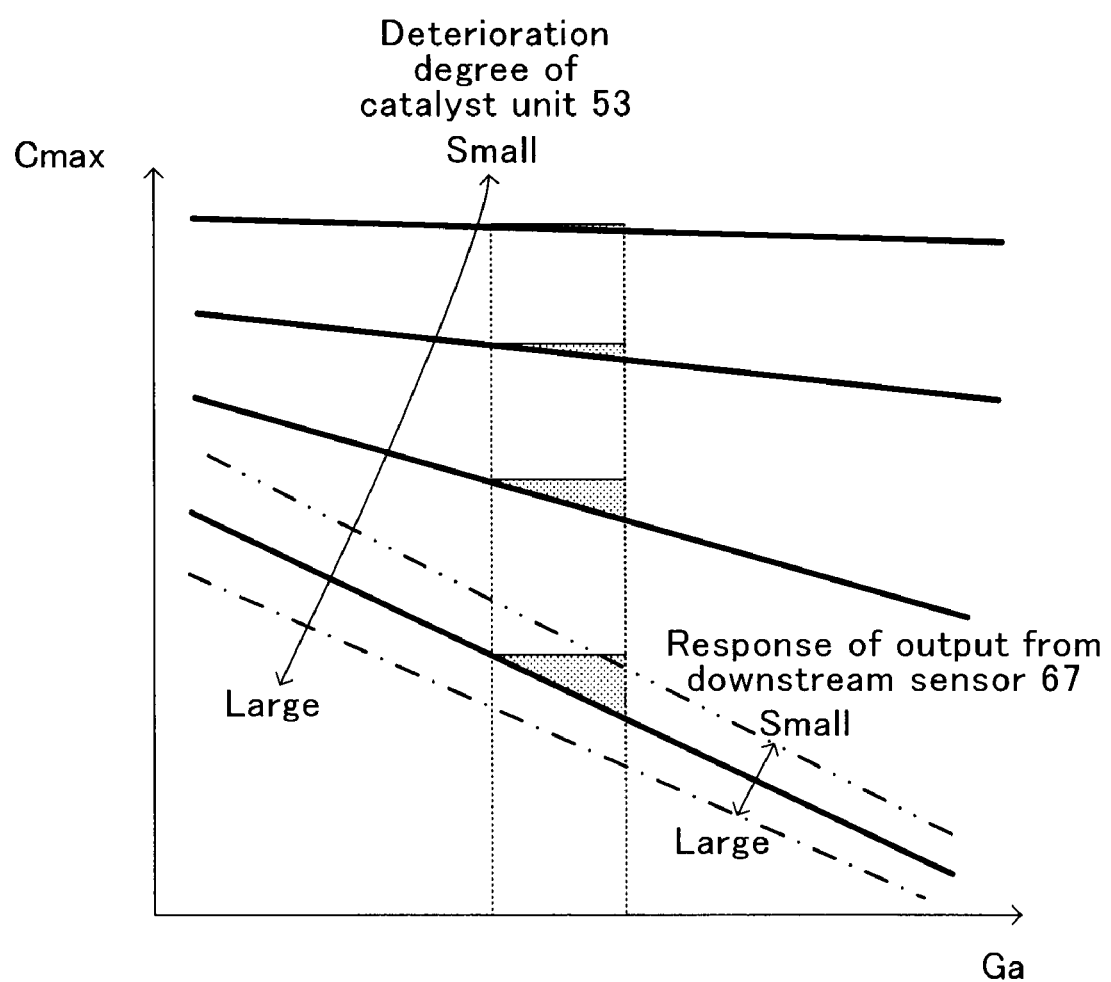
FIG. 5 is a graph showing the relationship between the flow rate of air sucked into the internal combustion engine, the deterioration degree of the catalyst, and the estimated maximum oxygen storing quantity.

FIG. 5 is a graph showing the relationship among the air flow rate Ga, the deterioration degree of the catalyst unit 53, and the estimated maximum oxygen storing quantity Cmax. As can be understood from the solid line in FIG. 5, as the deterioration degree of the catalyst unit 53 is great, the decreasing gradient (degree of the decrease) of the estimated maximum oxygen storing quantity Cmax with respect to the increase in the air flow rate Ga is more reduced. The decreasing gradient of the estimated maximum oxygen storing quantity Cmax with respect to the increase in the air flow rate Ga is simply referred to as "the decreasing gradient of the maximum oxygen storing quantity Cmax".

Meanwhile, the degree of the response to the change (changeover) of the output from the downstream air-fuel-ratio sensor with respect to the change in the air-fuel ratio of the exhaust gas from either one of the air-fuel ratio on the rich side with respect to the stoichiometric air-fuel ratio and the air-fuel ratio on the lean side with respect to the stoichiometric air-fuel ratio to the other has a characteristic of being likely to vary depending upon the property of the air-fuel-ratio sensor itself, deterioration, or the like. Therefore, the point when the output from the downstream air-fuel-ratio sensor 67 is reversed (changed), i.e., the period when the output from the downstream air-fuel-ratio sensor 67 is kept to be the value showing the lean state or the value showing the rich state, is likely to vary. Accordingly, the value of the estimated maximum oxygen storing quantity Cmax is also likely to vary.

When the deterioration degree of the catalyst unit 53 is the same, the "decreasing gradient of the maximum oxygen storing quantity Cmax" tends to be substantially the same, even if the degree of the response of the change in the output from the downstream air-fuel-ratio sensor 67 varies.

For example, when the degree of the response of the output from the downstream air-fuel-ratio sensor 67 is great and the output from the downstream air-fuel-ratio sensor 67 is quickly reversed (changed) with respect to the change in the air-fuel ratio of the exhaust gas from either one of the air-fuel ratio on the lean side with respect to the stoichiometric air-fuel ratio and the air-fuel ratio on the rich side with respect to the stoichiometric air-fuel ratio to the other, the period when the output from the downstream air-fuel-ratio sensor 67 is kept to be the value showing the lean state or the value showing the rich state becomes short, so that the maximum oxygen storing quantity Cmax is estimated to be a small value (see one-dot-chain line in FIG. 5).

On the other hand, when the degree of the response of the output from the downstream air-fuel-ratio sensor 67 is small and the output from the downstream air-fuel-ratio sensor 67 is reversed (changed) with a great delay with respect to the change in the air-fuel ratio of the exhaust gas from either one of the air-fuel ratio on the lean side with respect to the stoichiometric air-fuel ratio and the air-fuel ratio on the rich side with respect to the stoichiometric air-fuel ratio to the other, the period when the output from the downstream air-fuel-ratio sensor 67 is kept to be the value showing the lean state or the value showing the rich state becomes long, so that the maximum oxygen storing quantity Cmax is estimated to be a great value (see two-dot-chain line in FIG. 5).

In these cases, if the deterioration degree of the catalyst unit 53 is the same, the "decreasing gradient of the maximum oxygen storing quantity Cmax" becomes substantially the same, regardless of the magnitude of the degree of the response. Specifically, the "decreasing gradients of the maximum oxygen storing quantity Cmax" on the one-dot-chain line, on the two-dot-chain line, and on the solid line sandwiched between the one-dot-chain line and the two-dot-chain line in FIG. 5 tend to be substantially equal to one another.

From the above, the "decreasing gradient of the maximum oxygen storing quantity Cmax" can be an index capable of correctly indicating the deterioration degree of the catalyst unit 53, even if the degree of the response of the change in the output from the downstream air-fuel-ratio sensor 67 varies. Accordingly, it can be mentioned that, as the "decreasing gradient of the maximum oxygen storing quantity Cmax" is great, the deterioration degree of the catalyst unit 53 is great.

In view of this, the present apparatus obtains the "decreasing gradient of the maximum oxygen storing quantity Cmax" on the basis of two maximum oxygen storing quantities Cmax, which are respectively estimated by utilizing the "airfuel-ratio active control" and the above-mentioned equations (1) and (2) in case where the air flow rate Ga assumes two different values, and two values of the air flow rate Ga. Additionally, the present apparatus determines whether or not the deterioration degree of the catalyst unit 53 is the degree that needs the exchange of the catalyst unit 53 on the basis of the "decreasing gradient of the maximum oxygen storing quantity Cmax".

(Actual Operation)

Among the operations of the present apparatus executing the processes described above, the acquisition of the deterioration degree of the catalyst unit 53 and the determination of the deterioration of the catalyst unit 53 will be explained with reference to the flowchart shown in FIG. 6.

Figure 6:
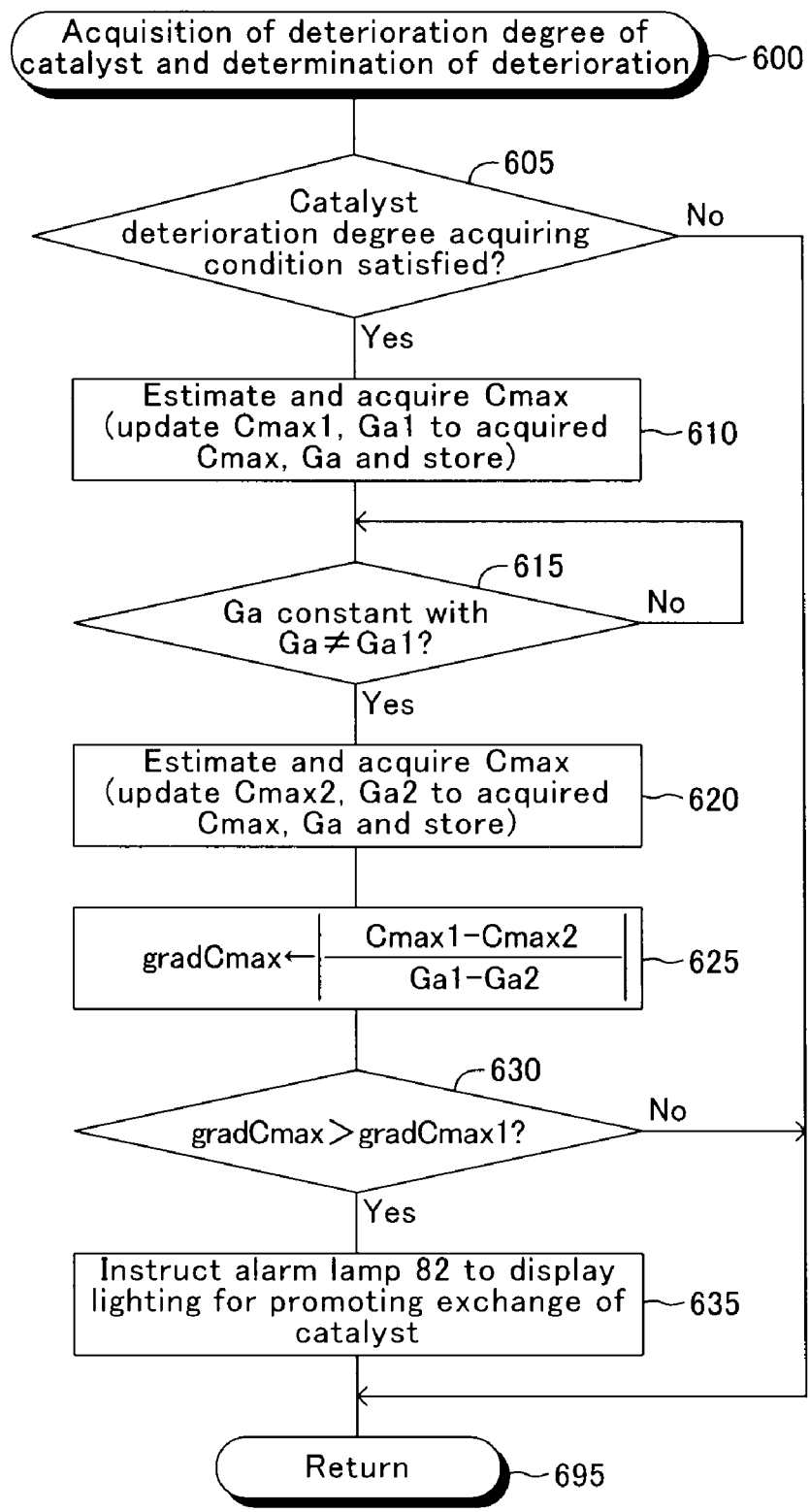
FIG. 6 is a flowchart showing a program that the CPU shown in FIG. 1 executes so as to acquire the deterioration degree of the catalyst, and determine the deterioration of the catalyst.

The CPU 71 repeatedly executes the routine shown by the flowchart in FIG. 6 for acquiring the deterioration degree of the catalyst unit 53 and determining the deterioration of the catalyst unit 53. The CPU 71 starts the processing from step 600, and proceeds to step 605, in which the CPU 71 determines whether or not the catalyst deterioration degree acquiring condition is satisfied or not. The catalyst deterioration degree acquiring condition is satisfied, in the present embodiment, when the cooling-water temperature THW is equal to or higher than a predetermined temperature, the vehicle speed obtained from an unillustrated vehicle speed sensor is equal to or higher than a predetermined high speed, the variation speed of the throttle valve opening TA is equal to or lower than a predetermined amount, the air flow rate Ga is constant, and the engine is steadily driven, and further, when a predetermined time has elapsed from the previous detection of the deterioration of the catalyst. The phrase that the air flow rate Ga is constant means that the speed of the change in the air flow rate Ga is equal to or lower than a predetermined amount (very small value).

When the catalyst deterioration degree acquiring condition is not satisfied, the CPU 71 makes a "No" determination at step 605, and directly proceeds to step 695 so as to end the present routine for the present. In this case, the air-fuel-ratio feedback control for controlling the catalyst upstream air-fuel ratio to the stoichiometric air-fuel ratio on the basis of the output value Vabyfs from the upstream air-fuel-ratio sensor 66 and the output value Voxs from the downstream air-fuel-ratio sensor 67 is executed without executing the "air-fuel-ratio active control" (i.e., without estimating and updating the maximum oxygen storing quantity Cmax).

On the other hand, when the catalyst deterioration degree acquiring condition is satisfied, the CPU 71 makes a "Yes" determination at step 610, and proceeds to step 610 where the maximum oxygen storing quantity Cmax of the catalyst unit 53 is estimated and acquired by utilizing the "air-fuel-ratio active control" and the above-mentioned equations (1) and (2), so as to update a first maximum oxygen storing quantity Cmax1 to the acquired maximum oxygen storing quantity Cmax and update the value of a first air flow rate Ga1 to the (average value of) air flow rate Ga acquired by the air flowmeter 61 upon estimating the maximum oxygen storing quantity Cmax. Further, the CPU 71 stores the updated first maximum oxygen storing quantity Cmax1 and the first air flow rate Ga1 to the backup RAM 74.

Next, the CPU 71 proceeds to step 615 so as to determine whether or not the air flow rate Ga is different from the first air flow rate Ga1 stored at step 610 and the air flow rate Ga is constant.

When the condition for the air flow rate Ga at step 615 is not satisfied, the CPU 71 makes a "No" determination at step 615, and proceeds again to step 615 so as to again make a determination as to whether the condition for the air flow rate Ga is satisfied or not.

On the other hand, when the condition for the air flow rate Ga is satisfied at step 615, the CPU 71 makes a "Yes" determination at step 615, and then, proceeds to step 620 in which the maximum oxygen storing quantity Cmax of the catalyst unit 53 is estimated and acquired by utilizing the "air-fuel-ratio active control" and the above-mentioned equations (1) and (2), so as to update a second maximum oxygen storing quantity Cmax2 to the acquired maximum oxygen storing quantity Cmax and update the value of a second air flow rate Ga2 to the (average of) the air flow rate Ga acquired by the air flowmeter 61 upon estimating the maximum oxygen storing quantity Cmax. Further, the CPU 71 stores the updated second maximum oxygen storing quantity Cmax2 and the second air flow rate Ga2 to the backup RAM 74. These steps 610 and 620 correspond to a part of the maximum oxygen storing quantity acquiring means.

Next, the CPU 71 proceeds to step 625 so as to obtain the decreasing gradient gradCmax of the maximum oxygen storing quantity Cmax on the basis of the first and second maximum oxygen storing quantities Cmax1 and Cmax2, the first and second air flow rates Ga1 and Ga2, and the equation shown in the box of step 625 (see FIG. 5). The step 625 corresponds to a part of the catalyst deterioration degree acquiring means.

Then, the CPU 71 proceeds to step 630 so as to determine whether or not the decreasing gradient gradCmax of the maximum oxygen storing quantity Cmax obtained at step 625 is greater than a deterioration determination reference gradient gradCmax1. The deterioration determination reference gradient gradCmax1 is the decreasing gradient gradCmax of the maximum oxygen storing quantity Cmax corresponding to the upper limit value of the deterioration degree within the deterioration degree of the catalyst unit 53 in which the exchange of the catalyst unit 53 is not needed.

When the decreasing gradient gradCmax of the maximum oxygen storing quantity Cmax is equal to or lower than the deterioration determination reference gradient gradCmax1, the CPU 71 makes a "No" determination at step 635, and directly proceeds to step 695 so as to end the present routine for the present.

On the other hand, when the decreasing gradient gradCmax of the maximum oxygen storing quantity Cmax is higher than the deterioration determination reference gradient gradCmax1, the CPU 71 makes a "Yes" determination at step 630, and proceeds to step 635 so as to issue an instruction to an alarm lam 82 to display a lighting that promotes a driver to exchange the catalyst unit 53. Thereafter, the CPU 71 proceeds to step 695 so as to end the present routine for the present.

As explained above, in case where the air flow rate Ga assumes different first and second air flow rates Ga1 and Ga2, the catalyst deterioration degree acquiring apparatus in an internal combustion engine according to the embodiment of the present invention obtains the decreasing gradient gradCmax of the maximum oxygen storing quantity Cmax with respect to the air flow rate Ga as the deterioration degree of the catalyst unit 53 on the basis of the first and second maximum oxygen storing quantities Cmax1 and Cmax2, which are respectively estimated by utilizing the "air-fuel-ratio active control", and the first and second air flow rates Ga1 and Ga2.

The decreasing gradient gradCmax of the maximum oxygen storing quantity Cmax with respect to the air flow rate Ga increases as the deterioration degree of the catalyst unit increases (see the solid line in FIG. 5). When the deterioration degree of the catalyst unit 53 is the same, the decreasing gradient gradCmax of the maximum oxygen storing quantity Cmax with respect to the air flow rate Ga tends to be substantially the same, even if the degree of the response of the change in the output from the downstream air-fuel-ratio sensor 67 with respect to the change of the air-fuel ratio from either one of the air-fuel ratio on the rich side with respect to the stoichiometric air-fuel ratio and the air-fuel ratio on the lean side with respect to the stoichiometric air-fuel ratio to the other varies (see the one-dot-chain line and two-dot-chain line in FIG. 5).

Accordingly, the deterioration degree of the catalyst unit 53 can correctly be acquired by obtaining the decreasing gradient gradCmax of the maximum oxygen storing quantity Cmax, even if the degree of the response of the change in the output from the downstream air-fuel-ratio sensor 67 varies.

The present invention is not limited to the aforesaid embodiment, and various modifications may be employed without departing from the scope of the invention. For example, in the above-mentioned embodiment, upon updating the second maximum oxygen storing quantity Cmax2 and the second air flow rate Ga2, the second maximum oxygen storing quantity Cmax2 is updated to the maximum oxygen storing quantity Cmax estimated at that time, and the second air flow rate Ga2 is updated to the air flow rate Ga that is constant at that time, when the air flow rate Ga becomes different from the first air flow rate Ga1 and the air flow rate Ga becomes constant. However, when the absolute value of the difference between the air flow rate Ga and the first air flow rate Ga1 becomes not less than a predetermined value, and this air flow rate Ga becomes constant, the second maximum oxygen storing quantity Cmax2 may be updated to the maximum oxygen storing quantity Cmax estimated at that time and the second air flow rate Ga2 may be updated to the air flow rate Ga that is constant at that time. In this case, as the predetermined value is great, the decreasing gradient gradCmax of the maximum oxygen storing quantity Cmax can more correctly indicate the deterioration degree of the catalyst unit 53.

In the above-mentioned embodiment, upon updating the first and second maximum oxygen storing quantities Cmax1 and Cmax2 and the first and second air flow rates Ga1 and Ga2, when the catalyst deterioration degree acquiring condition is satisfied, the first maximum oxygen storing quantity Cmax1 is updated to the maximum oxygen storing quantity Cmax estimated at that time, the first air flow rate is updated to the air flow rate Ga that is constant at that time, and then, when the air flow rate Ga becomes different from the first air flow rate Ga1 and this flow rate Ga becomes constant, the second maximum oxygen storing quantity Cmax2 is updated to the maximum oxygen storing quantity Cmax estimated at that time, and the second air flow rate Ga2 is updated to the air flow rate Ga that is constant at that time. However, when the catalyst deterioration degree acquiring condition is satisfied, the air flow rate Ga may be controlled to be the predetermined first air flow rate Ga1 (constant value), the first maximum oxygen storing quantity Cmax1 may be updated to the maximum oxygen storing quantity Cmax estimated at that time. Thereafter, the air flow rate Ga may be controlled to be the predetermined second air flow rate Ga2 (constant value) that is greater or smaller than the predetermined first air flow rate Ga1 by a predetermined amount, and the second maximum oxygen storing quantity Cmax2 may be updated to the maximum oxygen storing quantity Cmax estimated at that time. In this case too, as the predetermined amount is great, the decreasing gradient gradCmax of the maximum oxygen storing quantity Cmax can correctly indicate the deterioration degree of the catalyst unit 53.

In the above-mentioned embodiments, the decreasing gradient gradCmax of the maximum oxygen storing quantity Cmax is obtained on the basis of the first and second maximum oxygen storing quantities Cmax1 and Cmax2, which are respectively estimated when the air flow rate Ga assumes the first and second air flow rates Ga1 and Ga2 that are different from each other, and the first and second air flow rates Ga1 and Ga2. However, on the basis of the three or more maximum oxygen storing quantities Cmax, which are respectively estimated when the air flow rate Ga assumes three or more different values, and three or more air flow rates Ga, a curve, which has the second or larger order and indicates the relationship between the air flow rate Ga and the estimated oxygen storing quantity Cmax, may be obtained from a predetermined polynomial approximation, for example, wherein the average value of the rate of change (rate of decrease) of the maximum oxygen storing quantity Cmax to a predetermined increasing range of the air flow rate Ga on this curve may be obtained as the deterioration degree of the catalyst unit 53. Further, a straight line indicating the relationship between the air flow rate Ga and the estimated maximum oxygen storing quantity Cmax may be obtained from the least squares method, for example, wherein the gradient of this straight line may be obtained as the deterioration degree of the catalyst unit 53.

What is claimed is:

1. A catalyst deterioration degree acquiring apparatus that is applied to an internal combustion engine including a catalyst that is disposed in an exhaust passage of the internal combustion engine and has an oxygen storing function, a downstream air-fuel-ratio sensor that is disposed in the exhaust passage at a downstream side of the catalyst for outputting a value according to an air-fuel ratio of a gas flown out of the catalyst, and an upstream air-fuel-ratio sensor that is disposed in the exhaust passage at an upstream side of the catalyst for outputting a value according to an air-fuel ratio of a gas flowing into the catalyst, comprising:

maximum oxygen storing quantity estimating unit that changes the air-fuel ratio of the gas flowing into the catalyst to a predetermined lean air-fuel ratio, which is on a lean side with respect to a stoichiometric air-fuel ratio, from an air-fuel ratio on a rich side with respect to the stoichiometric air-fuel ratio at a point when the output from the downstream air-fuel-ratio sensor is changed to a state indicating the air-fuel ratio on the rich side with respect to the stoichiometric air-fuel ratio from a state indicating the air-fuel ratio on the lean side with respect to the stoichiometric air-fuel ratio; changes the air-fuel ratio of the gas flowing into the catalyst to a predetermined rich air-fuel ratio, which is on the rich side with respect to the stoichiometric air-fuel ratio, from an air-fuel ratio on the lean side with respect to the stoichiometric air-fuel ratio at a point when the output from the downstream air-fuel-ratio sensor is changed to the state indicating the air-fuel ratio on the lean side with respect to the stoichiometric air-fuel ratio from the state indicating the air-fuel ratio on the rich side with respect to the stoichiometric air-fuel ratio; and estimates a maximum oxygen storing quantity, which is a maximum quantity of oxygen storable by the catalyst, by utilizing at least the point when the output from the downstream air-fuel-ratio sensor is changed after the changeover of the air-fuel ratio of the gas flowing into the catalyst, and the output from the upstream air-fuel-ratio sensor; and catalyst deterioration degree acquiring unit that acquires, as a deterioration degree of the catalyst, a degree of decrease of the maximum oxygen storing quantity estimated with respect to an increase in the air flow rate on the basis of plural maximum oxygen storing quantities, which are respectively estimated in case where the flow rate of air sucked into the internal combustion engine assumes plural different values, and the plural values of the air flow rate.

2. A catalyst deterioration degree acquiring apparatus for an internal combustion engine according to claim 1, wherein the catalyst deterioration degree acquiring unit is configured to acquire, as the deterioration degree of the catalyst, a decreasing gradient of the maximum oxygen storing quantity estimated with respect to an increase in the air flow rate on the basis of two oxygen storing quantities, which are respectively estimated in case where the flow rate of the air sucked into the internal combustion engine assumes two different values, and the two values of the air flow rate.

* * * * *